United States Patent
Endle et al.

(10) Patent No.: US 8,834,758 B2
(45) Date of Patent: *Sep. 16, 2014

(54) THICK INORGANIC FIBER WEBS AND METHODS OF MAKING AND USING

(75) Inventors: James P. Endle, New Richmond, WI (US); George W. Frost, Afton, MN (US); Lahoussaine Lalouch, Picardie (FR); Mario A. Perez, Burnsville, MN (US); John J. Rogers, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 778 days.

This patent is subject to a terminal disclaimer.

(21) Appl. No.: 13/079,911

(22) Filed: Apr. 5, 2011

(65) Prior Publication Data

US 2011/0247838 A1   Oct. 13, 2011

Related U.S. Application Data

(60) Provisional application No. 61/323,515, filed on Apr. 13, 2010.

(51) Int. Cl.
*D04H 5/02* (2012.01)
*D04H 1/4209* (2012.01)
(Continued)

(52) U.S. Cl.
CPC .............. *B32B 5/022* (2013.01); *D04H 1/4209* (2013.01); *C04B 35/6224* (2013.01); *C04B 2235/5232* (2013.01); *C04B 35/806* (2013.01); *B32B 5/026* (2013.01); *C04B 2235/5212* (2013.01); *D04H 1/593* (2013.01); *C04B 2235/3206* (2013.01); *D04H 1/541* (2013.01); *F16L 5/04* (2013.01); *A62C 2/06* (2013.01); *D04H 1/736* (2013.01); *B32B 2307/3065* (2013.01); *C04B 2235/5252* (2013.01); *C04B 2235/3208* (2013.01); *D04H 1/498* (2013.01); *F16L 59/145* (2013.01); *C04B 35/82* (2013.01); *F16L 57/04* (2013.01); *C04B 2235/5264* (2013.01); *C04B 2235/526* (2013.01); *C04B 35/536* (2013.01)
USPC ......................................... 264/113; 264/115

(58) Field of Classification Search
CPC ........................................................ D01F 1/07
USPC .................................. 264/115, 121, 122, 113
See application file for complete search history.

(56) References Cited

U.S. PATENT DOCUMENTS

| | | | |
|---|---|---|---|
| 4,116,656 A | 9/1978 | Mukai | |
| 4,199,336 A | 4/1980 | Rittler | |

(Continued)

FOREIGN PATENT DOCUMENTS

| | | | |
|---|---|---|---|
| CN | 1404441 A | 3/2003 | |
| CN | 1968806 A | 5/2007 | |

(Continued)

OTHER PUBLICATIONS

Supplementary European Search Report, EP 11 76 9305.1, Dec. 5, 2013, 3 pages.

(Continued)

*Primary Examiner* — Davis Hwu
(74) *Attorney, Agent, or Firm* — Kenneth B. Wood

(57) ABSTRACT

Monolithic gravity-laid inorganic fiber webs that are greater than about 5 cm in thickness are disclosed. Methods of making and using such webs are also disclosed. The gravity-laying process comprises mechanically separating inorganic fibers and collecting the fibers as a monolithic thick web, and may comprise blending of multiple types of inorganic fibers and/or blending of inorganic particulate additives with the fibers.

21 Claims, 2 Drawing Sheets

(51) Int. Cl.
*C04B 35/622* (2006.01)
*C04B 35/80* (2006.01)
*B32B 5/02* (2006.01)
*D04H 1/593* (2012.01)
*D04H 1/541* (2012.01)
*F16L 5/04* (2006.01)
*D04H 1/736* (2012.01)
*D04H 1/498* (2012.01)
*F16L 59/14* (2006.01)
*C04B 35/82* (2006.01)
*F16L 57/04* (2006.01)
*C04B 35/536* (2006.01)
*A62C 2/06* (2006.01)

(56) References Cited

U.S. PATENT DOCUMENTS

| | | |
|---|---|---|
| 4,273,821 A | 6/1981 | Pedlow |
| 4,600,634 A | 7/1986 | Langer |
| 4,640,810 A | 2/1987 | Laursen |
| 4,808,097 A | 2/1989 | Takahashi |
| 5,123,949 A | 6/1992 | Thiessen |
| 5,232,638 A | 8/1993 | Thiessen |
| 5,290,522 A | 3/1994 | Rogers |
| 5,464,952 A | 11/1995 | Shah |
| 6,051,193 A | 4/2000 | Langer |
| 6,233,787 B1 | 5/2001 | Eriksen |
| 7,018,699 B2 | 3/2006 | Dykhoff |
| 8,343,400 B2 * | 1/2013 | Cordts et al. ............ 264/115 |
| 8,562,879 B2 * | 10/2013 | Frost et al. ............ 264/113 |
| 2003/0022577 A1 | 1/2003 | Kim |
| 2004/0147184 A1 | 7/2004 | Taylor, Jr. |
| 2005/0098910 A1 | 5/2005 | Andersen |
| 2006/0085951 A1 | 4/2006 | Celli |
| 2006/0154040 A1 | 7/2006 | Merry |
| 2006/0182915 A1 | 8/2006 | Frost |
| 2006/0257298 A1 | 11/2006 | Merry |
| 2007/0238380 A1 * | 10/2007 | Erb et al. ............ 442/136 |
| 2008/0160857 A1 | 7/2008 | Chacko |
| 2009/0227706 A1 | 9/2009 | Hansen |
| 2009/0308622 A1 | 12/2009 | Hansen |

FOREIGN PATENT DOCUMENTS

| | | |
|---|---|---|
| EP | 0 643 204 | 3/1995 |
| EP | 0 989 103 | 3/2000 |
| EP | 1 486 648 | 12/2004 |
| EP | 1 696 110 | 8/2006 |
| EP | 1 736 644 | 12/2006 |
| FR | 2 436 757 | 4/1980 |
| JP | 2002/247735 | 8/2002 |
| JP | 2008 045239 | 2/2008 |
| WO | WO 97/20781 | 6/1997 |
| WO | WO 97/36833 | 10/1997 |
| WO | 02/053373 A1 | 7/2002 |
| WO | WO 2004/031544 | 4/2004 |
| WO | WO 2005/044529 | 5/2005 |
| WO | WO 2005/098910 | 10/2005 |
| WO | 2005/105427 A1 | 11/2005 |
| WO | WO 2006/085951 | 8/2006 |
| WO | WO 2007/044485 | 4/2007 |
| WO | WO 2008/145131 | 12/2008 |
| WO | WO 2009/048857 | 4/2009 |
| WO | WO 2009/048859 | 4/2009 |
| WO | WO 2009/087236 | 7/2009 |

OTHER PUBLICATIONS

International Search Report, PCT/US2009/062188, mailed Jun. 4, 2010, 4 pages.
International Search Report, PCT/US2009/062193, mailed Mar. 30, 2010, 3 pages.
International Search Report, PCT/US2011/031146, mailed Dec. 28, 2011, 4 pages.
International Search Report, PCT/US2011/031195, mailed Dec. 28, 2011, 5 pages.
International Search Report, PCT/US2011/031155, mailed Dec. 27, 2011, 3 pages.
International Search Report, PCT/US2011/031164, mailed Dec. 27, 2011, 5 pages.
FormFiber Denmark ApS-Spike AirCarding Technical Information, Distributed during INTC 2008 International Nonwovens Technical Conference, Houston, TX, Sep. 8, 2008.
U.S. Appl. No. 13/127,194, Anne Nathalie de Rovere, filed Oct. 27, 2009.
U.S. Appl. No. 13/127,193, Anne Nathalie de Rovere, filed Oct. 27, 2009.
FormFiber Denmark ApS-Spike AirCarding Technical Information, Distributed during INTC 2008 International Nonwovens Technical Conference, Houston, TX, Sep. 8, 2011.
U.S. Appl. No. 13/080,060, Lahoussaine LaLouch, filed Apr. 5, 2011.
U.S. Appl. No. 13/079,885, George W. Frost, filed Apr. 5, 2011.

* cited by examiner

THICK INORGANIC FIBER WEBS AND METHODS OF MAKING AND USING

CROSS-REFERENCE TO RELATED APPLICATION

This application claims priority to U.S. Provisional Patent Application No. 61/323,515, filed Apr. 13, 2010, the disclosure of which is incorporated by reference herein in its entirety.

BACKGROUND

Wet-laid and dry-laid webs comprising inorganic fibers have been known for years and have been used in a wide variety of applications, particularly those involving resistance to elevated temperatures.

SUMMARY

Monolithic gravity-laid inorganic fiber webs that are greater than about 5 cm in thickness are disclosed. Methods of making and using such webs are also disclosed. The gravity-laying process comprises mechanically separating inorganic fibers and collecting the fibers as a monolithic thick web, and may comprise blending of multiple types of inorganic fibers and/or blending of inorganic particulate additives with the fibers.

Thus in one aspect, herein is disclosed a monolithic gravity-laid inorganic fiber web that is greater than about 5 cm in thickness.

Thus in another aspect, herein is disclosed a method of making a gravity-laid inorganic fiber web, comprising: introducing inorganic fibers into a forming chamber that comprises a plurality of fiber-separating rollers provided in at least one row within the forming chamber and that comprises a moving endless belt screen; mechanically separating at least some of the inorganic fibers with the fiber-separating rollers; capturing any remaining agglomerates of the inorganic fibers by the moving endless belt screen and returning the captured agglomerates to the fiber-separating rollers to be mechanically separated by the fiber-separating rollers; collecting the mechanically separated inorganic fibers as a gravity-laid inorganic fiber mat; removing the gravity-laid inorganic fiber mat from the forming chamber; and, consolidating the gravity-laid inorganic fiber mat to form a monolithic gravity-laid inorganic fiber web of greater than about 5 cm in thickness.

Thus in another aspect, herein is disclosed a method of enhancing the fire-protecting of a through-penetrating opening in a partition, the method comprising inserting at least one article comprising a gravity-laid inorganic fiber web that is greater than about 5 cm in thickness at least partially into the through-penetrating opening.

Thus in another aspect, herein is disclosed a method of enhancing the fire-protecting of an elongated object or a collection of elongated generally-aligned objects, the method comprising wrapping at least one an article comprising a gravity-laid inorganic fiber web that is greater than about 5 cm in thickness at least partially circumferentially around the object or collection of objects, along at least a portion of the elongated length of the object or collection of objects.

These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "outward", "inward", "up" and "down", and "first" and "second" may be used in this disclosure, it should be understood that those terms are used in their relative sense only unless otherwise noted.

DETAILED DESCRIPTION

Figure 1:
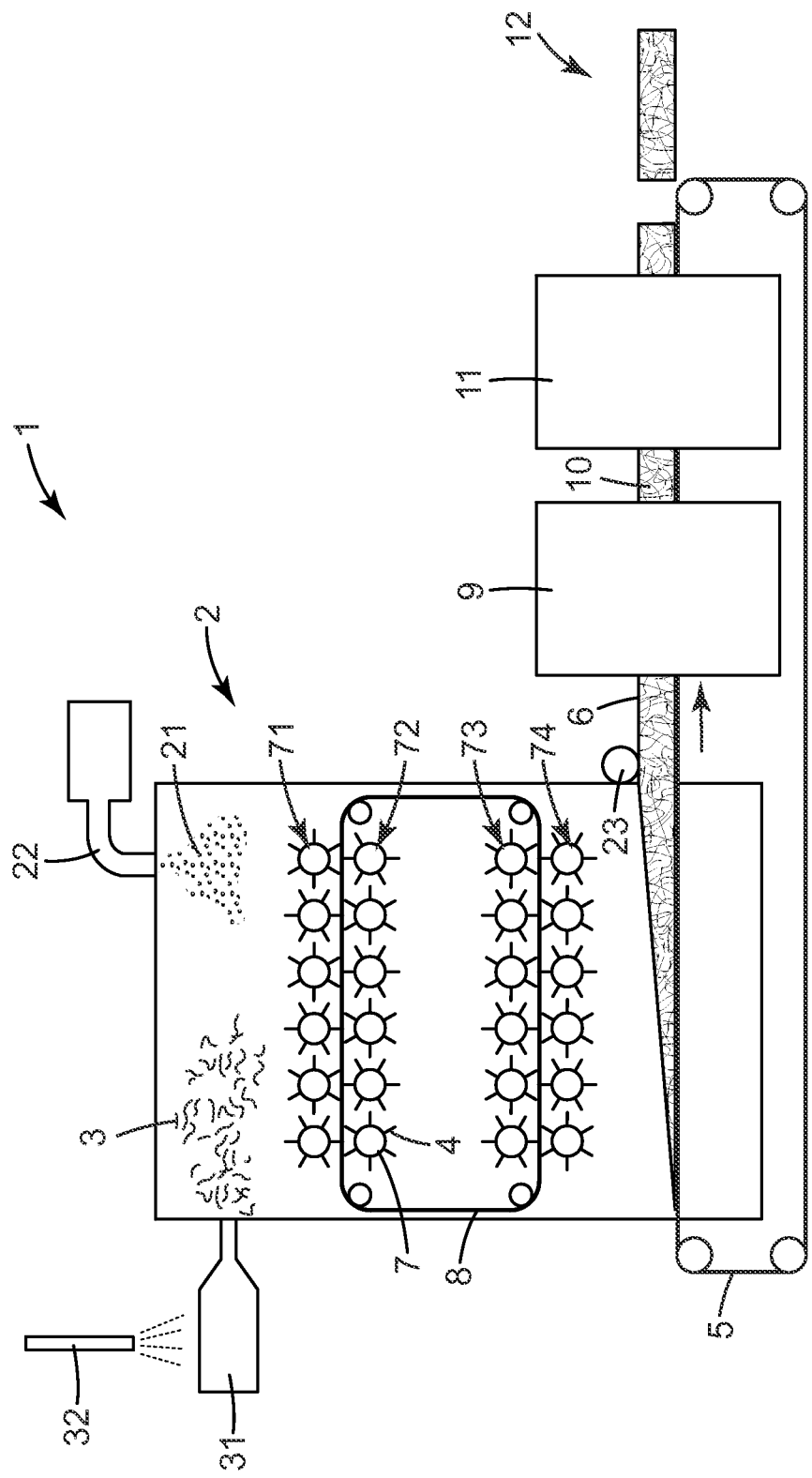
FIG. 1 shows a schematic side view of an exemplary process that can be used to make a gravity-laid inorganic fiber web.

FIG. 1 is a side view (with forming chamber 2 in cutaway) showing an exemplary apparatus 1 that can be used to make a thick gravity-laid inorganic fiber web 10 (with the term thick being defined herein as meaning at least 5 cm). Inorganic fibers 3 (which may include clumps, agglomerates of large numbers of fibers, and the like) are introduced into forming chamber 2, e.g. by way of fiber input device 31. Prior to entering forming chamber 2, an opener (not shown) may be used to at least partially open, comb, and/or separate the fibers 3 (e.g., from an as-received condition such as in a bale). In some embodiments, multiple types of fibers may be introduced into forming chamber 2, in which case the processes described herein will serve to blend the different type fibers together with each other, as well as to mechanically separate (e.g., de-agglomerate) fibers of each type. In some embodiments, one or more types of inorganic particulate additive 21 may be introduced into forming chamber 2, in which case the process described herein will serve to blend particulate additive 21 with the inorganic fibers, as well as to mechanically separate the inorganic fibers. Particulate additive 21 may comprise one or more intumescent additives, one or more endothermic additives, one or more insulative additives, and one or more binders, or the like, as described in detail later herein. If present, particulate additive 21 may be introduced into forming chamber 2 by fiber input device 31 along with fibers 3, or may be introduced separately, e.g. by way of particle input device 22. Apparatus 1 may also comprise a fluid (liquid) spray system 32, which may spray a fluid onto fibers 3 before they are introduced into forming chamber 2, may spray a fluid into the interior of forming chamber 2 so as to contact the fibers therein, and/or may spray a fluid onto fibers 3 after they are deposited as a mat and have exited forming chamber 2. The fluid may be used for any purpose.

For example, the fluid may comprise water, an aqueous solution, or a nonaqueous fluid or solution, that serves to enhance the processing of the fibers. Or, the fluid may comprise a solution, dispersion, latex, etc., e.g. comprising one or more binders, and/or comprising one or more inorganic particulate additives, as described in detail later herein. If desired, the fluid may comprise inorganic particulate additive 21.

Within forming chamber 2, inorganic fibers 3 are mechanically separated (e.g., partially, mostly, or nearly completely, de-agglomerated) into individual fibers and/or groups of a few fibers or less. This is accomplished by rotating fiber-separating rollers 7 each of which comprises protrusions 4 (referred to by the general term spikes, although they may be of any suitable design). The spikes 4 of adjacent rollers 7 are in intermeshing relation (although they typically do not contact each other), and so can apply shear force to agglomerates of fibers 3 (particularly when an agglomerate is momentarily caught between two moving, e.g. counter-rotating, spikes) and at least partially separate the agglomerates into individual fibers or into agglomerates of smaller numbers of fibers. In some embodiments, fiber-separating rollers 7 may be present as an upper set of roller rows 71 and 72, and a lower set of roller rows 73 and 74, as shown in FIG. 1. Those of ordinary skill in the art will appreciate that the design and operating parameters of forming chamber 2 and fiber-separating rollers 7 therein, may be manipulated in consideration of the particular composition and/or properties of the fibers to be processed therein. For instance, any or all of the spacing of the rollers, the spike length, the spike spacing along the rollers and around the rollers, the degree of intermeshing of the spikes, the speed of rotation of the various rollers, the direction of rotation of the various rollers, and the like, may be varied e.g. in order to increase the residence time of certain fibers within chamber 2, to enhance the amount of mechanical separation of the fibers, and the like. The action of the fiber-separating rollers may be enhanced by optional air streams, e.g. by the use of (optional) air nozzles appropriately located in forming chamber 2, that may cause fiber agglomerates to tumble and/or to recirculate within forming chamber 2. (It is noted that while the term air is used herein, the term is used in its broadest meaning and can encompass the use of any suitable gaseous fluid).

Fiber input device 31 may be advantageously positioned in an upper portion of forming chamber 2 (as shown in FIG. 1), e.g. so that fibers 3 may be easily brought in proximity to fiber-separating rollers 7 to be processed as described above. Particle input device 22 may be located in an upper portion of forming chamber 2, e.g. if it is desired to have particulate additives 21 be brought into proximity to rollers 7. Or, particle input device 22 may be located in a lower portion of forming chamber 2 (e.g., below rollers 7). Any arrangement is possible, as long as sufficient blending of particulate additives 21 with the fibers is achieved for a particular application.

Agglomerates of fibers, and/or individual fibers, will eventually fall downward, under the influence of gravity, within forming chamber 2. Forming chamber 2 comprises endless belt screen 8 (which may e.g. pass through upper set of fiber-separating roller rows 71 and 72 and through lower set of fiber-separating roller rows 73 and 74 generally as shown in FIG. 1). Endless belt screen 8 may comprise through-holes of a desired size or mixture of sizes. Accordingly, fiber agglomerates, clumps or the like, if present and if greater than a certain size, may be captured by endless belt screen 8 and recirculated within forming chamber 2 so as to pass through one or both of the sets of fiber-separating rollers for additional mechanical separation (e.g., de-agglomeration). The use of forming chamber 2 for the mechanical separation and/or blending of inorganic fibers is described in further detail in PCT Published Application WO 2009/048859, the disclosure of which is herein incorporated by reference.

The mechanically separated fibers (which may comprise blended fibers, if multiple types of inorganic fibers are used, and/or may be blended with particulate additives 21, if present) that avoid being recirculated by endless belt screen 8, are impelled by gravity to eventually land on carrier 5 (which may conveniently be an endless belt or the like) to form fiber mat 6. Typically, fibers 3 land in a configuration that may be generally parallel to the surface of carrier 5, and that may be generally random with respect to the downweb and crossweb axes of carrier 5. Carrier 5 is at the bottom of forming chamber 2, which encompasses carrier 5 e.g. being passed through a lower portion of forming chamber 2, or being passed underneath an opening in the bottom of forming chamber 2, so that in either case fibers 3 (and particulate additives 21, if present) can be deposited thereon. Carrier 5 may be air-permeable; and, an at least partial vacuum may be applied to the bottom surface of carrier 5, so that a pressure differential can be applied through carrier 5 to assist in the depositing and retaining of fibers and particulate additives on carrier 5. It may be convenient to use a disposable air-permeable layer (e.g., a thin disposable porous paper liner) atop carrier 5 if desired. The gravity-laying process can advantageously deposit fibers 3 (and particulate additives 21, if present), generally uniformly across the crossweb thickness of the formed fiber mat 6.

Fiber mat 6 can be carried out of, or away from, forming chamber 2, upon carrier 5. If desired, roll 23 may be provided at the point at which fiber mat 6 exits forming chamber 2. Roll 23 may cause fiber mat 6 to momentarily compress, although typically fiber mat 6 may rebound substantially. All references herein to an as-deposited thickness of fiber mat 6 refer to the thickness of fiber mat 6 after having passed under the roll. Fiber mat 6 may be carried to various processing units as described in further detail later herein, while residing on carrier 5 (as in the exemplary embodiment of FIG. 1). Or, fiber mat 6 may be transferred from carrier 5 onto a separate carrier for such purposes.

The present method may also be used to reduce the amount of shot in the fiber population, if shot is present. Those of ordinary skill in the art are familiar with shot as particles, e.g. solid particles, which are sometimes formed e.g. in melt-processing of fibers, and which can have disadvantageous effects. By the shearing action of the fiber-separating rollers, shot can be removed from the fiber population and can then be separated from the fibers, for example by sieves, if provided in chamber 2. Alternatively, shot may be separated from the fibers by centrifugal forces e.g. using a cyclonic separation device.

The above-described process of fiber agglomerates being mechanically separated (e.g., de-agglomerated) by fiber-separating rollers 7 (rotating at relatively low speeds and hence imparting relatively low shear), with mechanically separated fibers 3 falling through chamber 2 to land on carrier 5 and with any remaining fiber agglomerates (if present) being recirculated by endless belt screen 8, is termed herein as gravity-laying, with an inorganic fiber mat formed therefrom termed a gravity-laid inorganic fiber mat. The gravity-laying process can be distinguished from so-called wet laid web formation processes which rely on papermaking apparatus and methods. This process can also be distinguished from well-known conventional dry-laying web formation processes such as carding, garnetting and air-laying. Carding or garnetting involves mechanical separation of fiber clumps (e.g., by carding rolls generally rotating at relatively high speeds) and alignment of the fibers into a generally parallel, downweb-oriented configuration. This type of (relatively high shear) mechanical separation is well known to impart substantial breakage if used with inorganic fibers, in particular with ceramic fibers and/or inorganic fibers that are relatively long. Air-laying processes (such as those using commercially available web forming machines such as those marketed under the trade designation "RANDO WEBBER" by Rando Machine Corp. of Macedon, N.Y.; or "DAN WEB" by ScanWeb Co. of Denmark), involve the use of a lickerin roll (generally rotating at relatively high speed) and a high velocity air stream to convey fibers onto a collecting surface. In like manner to mechanical carding, air-laying is known to cause significant breakage to inorganic fibers, particularly to relatively long and/or ceramic inorganic fibers. In contrast, the gravity-laying process relies on fiber-separating rollers which (e.g., by rotating at much lower speeds than the speed of rotating lickerin rolls, rotating carding rolls and the like) can process inorganic fibers, particularly long fibers and/or ceramic fibers, with minimal breakage.

As deposited on carrier 5 by the methods described above, inorganic fibers 3 comprise inorganic fiber mat 6 which may have little or no mechanical strength or integrity. Fiber mat 6 can then be consolidated, e.g. by consolidation unit 9, so as to have sufficient mechanical integrity to comprise inorganic fiber web 10. By inorganic fiber web is meant an inorganic fiber mat that has been consolidated (e.g., by way of some or all of the fibers of the web being entangled with each other and/or being bonded to each other, either directly or indirectly) so that the web is a self-supporting web, e.g. with sufficient mechanical strength (downweb, crossweb, and through the thickness of the web), to be handled in operations such as rolling, cutting, converting, and the like, so as to enable inorganic fiber web 10 to be formed into various products as disclosed herein. Fiber mat 6 can remain on carrier 5 during the consolidation process (as shown in the exemplary arrangement of FIG. 1); or, fiber mat 6 can be transferred to a separate carrier for consolidation. By the methods disclosed herein, fiber mat 6 can be consolidated so as to provide a fiber web 10 that is at least about 5 cm thick.

In some embodiments the fiber mat is consolidated by needle-punching (also known as needle tacking) In such cases, consolidation unit 9 may comprise a needle-punching unit. A needle-punched mat refers to a mat wherein there is physical entanglement of fibers provided by multiple full or partial penetration of the mat, for example, by barbed needles. The fiber mat can be needle-punched using a conventional needle-punching apparatus (e.g., a needle-puncher commercially available under the trade designation "DILO" from Dilo, Germany, with barbed needles (commercially available, for example, from Foster Needle Company, Inc., Manitowoc, Wis.) to provide a needle-punched fiber mat. The number of needle-punches per area of mat may vary depending on the particular application, and in particular in view of the reduction in thickness of the web that it is desired to impart in performing the needle-punching process. In various embodiments, the fiber mat may be needle-punched to provide about 2 to about 2000 needle-punches/cm$^2$. Those of ordinary skill in the art will appreciate that any suitable needle, including those known to be particularly suitable for the processing of inorganic fibers, may be used. Suitable needles may include for example those available from Foster Needle, Manitowoc, Wis., under the trade designations 15×18×32×3.5RB F20 9-6NK/CC, 15×18×32×3.5CB F20 9-6.5NK/CC, 15×18×25×3.5RB F20 9-7NK, and 15×18×25×3.5RB F20 9-8NK, or the equivalents thereof. The needles may penetrate through the entire thickness of the mat, or only partially therethrough. Even if the needles do not penetrate all the way into the fiber mat, the needle-punching process may at least provide sufficient fiber entanglement in a layer proximal to the surface of the mat, to enhance the tensile strength of the fiber web in the downweb and crossweb directions. In some embodiments of this type, the needle-punching may result in the formation of a substantially densified surface layer comprising extensively entangled fibers. Such a densified surface layer may e.g. have a density of fibers per unit volume of the densified layer that is at least 20, at least 30, or at least 40% higher than the fiber density of an interior portion of the web that was not needle-punched. In various embodiments, the mat can be needle-punched from one side, or from both sides.

Needle-punching can be performed so as to preserve the as-deposited thickness of the fiber mat so as to form a thick fiber web, according to methods disclosed herein. In various embodiments, needle-punching may be performed so that the thickness of the gravity-laid inorganic fiber web is at least about 60%, at least 80%, at least 90%, or at least 95%, of the thickness of the gravity-laid inorganic fiber mat. In some embodiments, this may be achieved by performing only a minimal amount of needle-punching to provide the thus-formed fiber web with a desired tensile strength along the downweb and crossweb dimensions of the web. In some embodiments, needle-punching may be performed only within a layer of the fiber mat that is proximal to a major surface thereof, and not within a layer deep in the interior of the fiber mat. Such needle-punching may e.g. form a surface layer of highly entangled fibers that enhances the crossweb and downweb tensile properties of the web. In particular embodiments, such needle-punching is performed on a layer proximal to the first major surface of the web, and on a layer proximal to the second major surface of the web.

In any or all of these embodiments, the inorganic fibers may be selected to have at least some fibers with length and/or other properties (e.g., relative absence of brittleness) that increase the amount to which the needle-punching enhances the tensile properties of the formed fiber web. For example, the fiber mat may comprise at least 5%, 10%, 20%, or 40%, of long inorganic fibers chosen from the group consisting of long glass fibers, long ceramic fibers, and long basalt fibers.

In some embodiments the fiber mat may be consolidated by stitchbonding using techniques e.g. as taught in U.S. Pat. No. 4,181,514. For example, the mat may be stitchbonded with an organic thread or an inorganic thread, such as glass, ceramic or metal (e.g., stainless steel).

In some embodiments, the fiber mat may be consolidated by a bonding process in which the mat contains a binder which is activated to bond at least some of the fibers together. Such a binder may be introduced in solid form (e.g., in the form of a powder, as fibers, etc.), in liquid form (such as a solution, dispersion, suspension, latex, or the like), and so on. Whether in solid or liquid form, one or more binders may be introduced into forming chamber 2 by being deposited onto, or mixed with, fibers 3 before fibers 3 are introduced into forming chamber 2; or, may be introduced into forming chamber 2 so as to contact fibers 3 therein; or, may be deposited onto/into fiber mat 6 after formation of fiber mat 6, as desired. The binder(s) may be distributed throughout the interior of fiber mat 6, or may be present primarily at one or more major surfaces thereof (e.g., if the binder is deposited on a major surface of fiber mat 6 in such a way as to not penetrate substantially into fiber mat 6). In such cases the binder(s) may provide a surface layer of bonded fibers that enhances the downweb and/or crossweb tensile strength of the web. The binder(s) may be organic or inorganic. In the event that one or more inorganic particulate additives (e.g., one or more intumescent additives, one or more endothermic additives, one or more insulative additives, or mixtures thereof) are to be included in the web, the binder(s) may serve to bind the inorganic particulate additive(s) in the web. In some embodiments, consolidation can be achieved by a combination of needle-punching and activation of one or more binder(s). In such embodiments, the needle-punching can be performed before the activation of the binder, or after.

As organic binders, various rubbers, water-soluble polymer compounds, thermoplastic resins, thermosetting resins or the like may be suitable. Examples of rubbers include natural rubbers; acrylic rubbers such as copolymers of ethyl acrylate and chloroethyl-vinyl ether, copolymers of n-butyl acrylate and acrylonitrile or the like; nitrile rubbers such as copolymers of butadiene and acrylonitrile or the like; butadiene rubbers or the like. Examples of water-soluble polymer compounds include carboxymethyl cellulose, polyvinyl alcohol or the like. Examples of thermoplastic resins include acrylic resins in the form of homopolymers or copolymers of acrylic acid, acrylic acid esters, acrylamide, acrylonitrile, methacrylic acid, methacrylic acid esters or the like; an acrylonitrile-styrene copolymer; an acrylonitrile-butadiene-styrene copolymer or the like. Examples of thermosetting resins include bisphenol-type epoxy resins, novolac-type epoxy resins or the like. Such organic binders may be used in the form of a binder liquid (e.g., an aqueous solution, a water-dispersed emulsion, a latex or a solution using an organic solvent).

Bonding may also be accomplished by including an organic polymeric binder material in the form of a powder or fiber into the mat, and heat treating the mat so as to cause melting or softening of the polymeric material thereby bonding at least some of the fibers of the mat to each other. In such cases, consolidation unit 9 may comprise an oven or any other suitable heat source. Suitable polymeric binder materials that may be included in the mat include thermoplastic polymers including polyolefins, polyamides, polyesters, vinyl acetate ethylene copolymers and vinylester ethylene copolymers. Alternatively, thermoplastic polymeric fibers may be included in the mat. Examples of suitable thermoplastic polymeric fibers include polyolefin fibers such as polyethylene, or polypropylene, polystyrene fibers, polyether fibers, polyester fibers such as polyethylene terephthalate (PET) or polybutylene terephthalate (PBT), vinyl polymer fibers such as polyvinyl chloride and polyvinylidene fluoride, polyamides such as polycaprolactam, polyurethanes, nylon fibers and polyaramid fibers. Particularly useful fibers for thermal bonding of the fiber mat include also the so-called bicomponent bonding fibers which typically comprise polymers of different composition or with different physical properties. Often, such fibers are core/sheath fibers where e.g. the polymeric component of the core has a higher melting point and provides mechanical strength and the sheath has a lower melting point to enable bonding, e.g. melt-bonding, to occur. For example, in one embodiment, the bicomponent bonding fiber may be a core/sheath polyester/polyolefin fiber. Bicomponent fibers that can be used include those commercially available under the trade designation "TREVIRA 255" from Trevira GmbH, Bobingen, Germany, and under the trade designation "FIBER VISION CREATE WL" from FiberVisions, Varde, Denmark.

Such organic binders, if present, may be used in any suitable amount. In various embodiments, the amount of organic binder may be less than about 20%, 10%, 5%, 2%, 1%, or 0.5% by weight, based on the total weight of inorganic fiber web 10. In some embodiments, the amount of organic binder may be at least 0.2%, 0.5%, or 1.0%. In some embodiments, the inorganic fiber web contains substantially no organic binder. Those of ordinary skill will appreciate that as used here and in other contexts herein, the term "substantially no" does not preclude the presence of some extremely low, e.g. 0.1% by weight or less, amount of material, as may occur e.g. when using large scale production equipment subject to customary cleaning procedures. Such organic binders may be used singly, in combination with each other, and/or in combination with one or more inorganic binders, as desired. Such organic binders may be used in combination with any suitable inorganic fibers, including e.g. ceramic fibers, biosoluble fibers, basalt fibers, mineral wool fibers, and any combinations thereof. Such organic binders may also be used in combination with any suitable inorganic particulate additive, including e.g. intumescent, endothermic, and/or insulative additives, and mixtures thereof.

Inorganic binders may be used if desired (e.g., instead of, or in combination with, the above-mentioned organic binders), and may provide advantageous high temperature performance e.g. in certain fire-protective applications. Suitable inorganic binders may include, for example, alkali metal silicates, phosphates, borates, clays, and the like. Thus, suitable inorganic binders may include e.g. sodium silicate, potassium silicate, lithium silicate, silicophosphate, aluminum phosphate, phosphoric acid, phosphate glass (e.g., water-soluble phosphate glass), borax, silica sol, bentonite, hectorite, and the like. Such binders may be used singly, in combination with each other, and/or in combination with one or more organic binders, as desired. Such inorganic binders may be used in combination with any suitable inorganic fibers, including e.g. ceramic fibers, biosoluble fibers, basalt fibers, mineral wool fibers, and any combinations thereof. Such inorganic binders may also be used in combination with any suitable inorganic particulate additive, including e.g. intumescent additives, endothermic additives, and/or insulative additives.

Such inorganic binders, if present, may be used in any suitable amount. In various embodiments, the amount of inorganic binder may be at least 0.1%, 0.5%, or 1.0% by weight, based on the total weight of inorganic fiber web 10. In further embodiments, the amount of inorganic binder may be at most 20%, 10%, or 5%. Binders as disclosed above, whether organic or inorganic, typically will be activated in order to bond at least some of fibers 3 to each other to consolidate inorganic fiber mat 6 into inorganic fiber web 10, and/or to bind one or more inorganic particulate additives into inorganic fiber web 10. Such activation processes may comprise heat exposure (e.g., in the case of bicomponent organic polymeric bonding fibers). Or such activation processes may comprise removal of liquid, e.g., solvent (e.g., removal of water in the case of inorganic binders such as sodium silicate and the like). Such activation by removal of solvent may be assisted by heat exposure, if desired. Any combination of such processes falls under the term activation, as used herein.

As discussed above, in some embodiments a thick gravity-laid inorganic fiber mat may be consolidated to form a thick gravity-laid inorganic fiber web by the activation of one or more binders (whether organic or inorganic). For example, if a heat-activated binder is used, inorganic fiber mat 6 may be consolidated into inorganic fiber web 10 by being passed through an activation unit 9 (e.g., an oven, or any other suitable heat source, including e.g. IR lights and the like). In such cases, the activation process may be controlled so as to not significantly reduce the thickness of the fiber mat in the activation process. This may be performed, for example, by compressing the web very lightly, or not at all, when the web exits an oven at the end of the consolidation process. In some embodiments, a binder may be provided in a layer of the fiber mat that is proximal to a major surface thereof, with binder not being provided within a layer deep in the interior of the fiber mat. Activation of the binder may thus provide the web with a surface layer that enhances the tensile strength along the downweb and crossweb dimensions of the web.

In some embodiments, a thick gravity-laid inorganic fiber web may result from the consolidation of a fiber mat by activation of one or more binders, in combination with needle-punching. In such case, a relatively low level of binder may be used (e.g., less than about 5% by weight, less than about 2% by weight, or less than about 1% by weight, based on the total fiber weight), along with a relatively low amount of needle-punching, with the two combining to provide the web with the desired tensile strength. In particular embodiments, the web may comprise a (relatively low) amount of binder that is sufficient to enhance the tensile properties of the web in the thickness direction of the web, with at least one layer of the web that is proximal to a major surface of the web being needle-punched to enhance the tensile properties of the web in the crossweb and/or downweb directions. As mentioned, needle-punching can be performed before the activation of binder, or after.

The above-described process of gravity-laying, followed by consolidation, can be used to produce a thick gravity-laid inorganic fiber web of at least 5 cm in thickness. As defined herein, the term gravity-laid inorganic fiber web means a nonwoven web in which at least about 80 weight % of the fibers of the web are inorganic fibers and that was made by the consolidation of an inorganic fiber mat made by the above-described process of separating fibers (e.g., from an initially at least partially clumped or agglomerated state) by the mechanical action of fiber-separating rollers, with the mechanically separated fibers allowed to gravity-drop onto a collecting surface to form a mat, with any remaining clumps or agglomerates of fibers (if present) being recycled to undergo the mechanical separation process again. In various embodiments, at least about 90 weight %, or at least about 95 weight %, of the fibers of the web are inorganic fibers.

Those of ordinary skill in the art will recognize that a gravity-laid inorganic fiber web as defined and described herein can be distinguished from a conventional wet-laid web by way of any or all of several measurable properties of the web. For example, those of ordinary skill in the art will appreciate that wet-laid webs as conventionally made will comprise structural features indicative of a wet-laid process, and/or will comprise various adjuvants (which may include e.g. binders, processing aids, flocculants, antifoamers, and so on) which, even if present in the final dried web only in microscopic quantities, can be identified as indicative of a wet-laid process.

Those of ordinary skill in the art will further recognize that a gravity-laid inorganic fiber web as disclosed and described herein can be distinguished from a conventional carded web, e.g., by virtue of the fact that the webs described herein may comprise fibers oriented in a generally random fiber orientation (with respect to the length and width of the web), in contrast to conventional carded webs which typically exhibit a configuration in which the fibers of the web are oriented generally parallel to each other along the downweb axis of the web. In some cases, a gravity-laid inorganic web as disclosed herein may be distinguished from a carded web by virtue of the gravity-laid web comprising inorganic fibers having a length that is similar to (i.e., at least 80% of, or even 90% of, on average) the length of the inorganic fibers that were used to make the web. In contrast, as discussed above, conventional carding processes typically produce webs in which the length of the inorganic fibers is significantly reduced from (i.e., is less than 80% of) their length prior to being carded. Such distinctions may be particularly evident in the use of long inorganic fibers (with long being defined herein as meaning at least about five cm in length), and/or in the use of ceramic fibers, which are known to those of ordinary skill to be quite brittle and fragile. A gravity-laid web is similarly distinguishable from conventional air-laid webs (e.g., made by a Rando-Webber type apparatus) in similar manner, for similar reasons.

Those of ordinary skill in the art will still further recognize that a gravity-laid inorganic fiber web as defined and described herein can be distinguished from inorganic fiber webs made by generation and direct collection of inorganic fibers (e.g., made by supplying mineral melt to a rotating rotor and directly collecting solidified fibers made thereby). A gravity-laid inorganic fiber web may be distinguished from such direct-collected webs e.g. by virtue of the gravity-laid web comprising little or no shot in comparison to conventional direct-collected inorganic fiber webs, comprising few or no fiber clumps or agglomerates in comparison to conventional direct-collected inorganic fiber webs, comprising fibers of discrete length (e.g., chopped fibers), comprising fibers of two or more distinct populations (e.g., differing in size, length, composition, etc.), and/or comprising particulate additive(s) and/or binder(s) of a composition and/or amount incompatible with direct-collection methods. In particular, a gravity-laid inorganic fiber web may be distinguished from such direct-collected webs by virtue of the high cross-web thickness uniformity that may be exhibited by the gravity-laid web (for example, the thickness may vary less than 10% from the crossweb edges of the web to the center of the web). Those of ordinary skill will appreciate that direct-collected webs are typically noticeably thinner toward their crossweb edges than along their centerline, owing to the nature of the melt-formation/direct-collection process.

A thick gravity-laid inorganic fiber web as disclosed herein is defined as being at least about 5 cm in thickness. As defined herein, the thickness of an inorganic fiber web means the distance between the first and second major surfaces of the web, along the shortest dimension of the web, and is defined herein as being obtained by placing the web on a flat hard surface and placing a 0.6 meter×0.6 meter, 2.0 kg flat panel (e.g., a flat metal panel) atop a 0.6 meter×0.6 meter portion of the web (for a loading of approximately 0.54 grams/cm$^2$). Such a weighted panel can compensate for any thickness variations (e.g., when samples are made on pilot scale equipment) and can provide an "overall" thickness of a web. (In certain circumstances, e.g. in the evaluation of crossweb variations in thickness of a web, it may be preferred to measure the thickness of various web portions, in the absence of such a weight). All references herein to the as-deposited thickness of a fiber mat, and all references to the final thickness of a fiber web, refer to the thickness measured with a 2 kg panel, unless specifically noted otherwise. The thick gravity-laid inorganic fiber web is a monolithic web, meaning that it is made of one continuous layer (e.g., of a generally uniform composition), as opposed to being a stack of multiple individually discernable layers. (Other layers may be added to the web as desired). This thickness may allow the web to be advantageously used in applications such as fire-protective pillows, fire-protective blankets and the like, as discussed later herein.

In some embodiments, the web may comprise a bulk density of about 0.1 grams per cm$^3$ or less. In other embodiments, the web may comprise a bulk density of greater than 0.1, to 0.3, grams per cm$^3$. In still other embodiments, the web may comprise a bulk density of greater than 0.3, to 1.0 grams per cm$^3$. In particular embodiments, the web may comprise a bulk density of greater than 1.0 grams per cm³. In some embodiments, a gravity-laid inorganic fiber web as disclosed herein may comprise a weight per unit area in the range from about 500 g/m² to about 20000 g/m².

Figure 2:
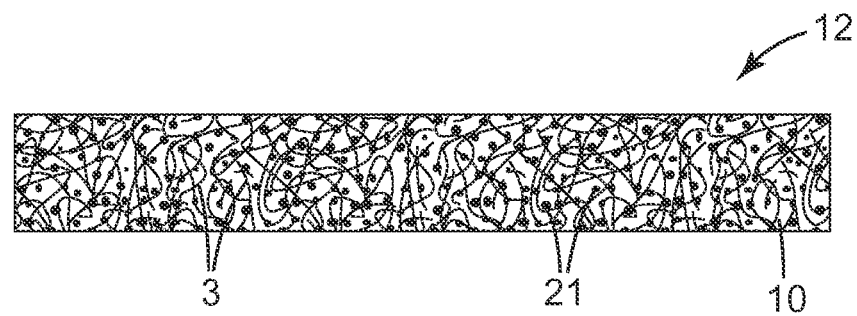
FIG. 2 shows a side view of an exemplary article comprising a gravity-laid inorganic fiber web.

Thick gravity-laid inorganic fiber web 10 can be further processed, e.g. by post-processing unit 11, to separate web 10 into discrete articles 12. Articles 12 (as shown in an exemplary embodiment in FIG. 2) may comprise any suitable shape, size or configuration as desired for a given use. In particular, articles 12 may be useful in fire-protective applications, as discussed later herein in detail.

As mentioned above, at least about 80% by weight of the fibers of thick gravity-laid inorganic fiber web 10 are inorganic fibers (e.g., that contain less than 2 weight % carbon). In some embodiments, substantially all of the fibers of the web are inorganic fibers. Those of ordinary skill will appreciate that as used here and in other contexts herein, the term "substantially all" does not preclude the presence of some extremely low, e.g. 0.1 weight % or less, amount of other fibers, as may occur e.g. when using large scale production equipment subject to customary cleaning procedures. In the gravity-laid inorganic fiber webs disclosed herein, inorganic fibers are mechanically separated (e.g. from clumps, if present) into individual fibers, or at least into agglomerates of only a few fibers, as described above. Thus, by definition, gravity-laid inorganic fiber webs do not encompass webs in which inorganic fibers are present in the web only in the form of granulates, generally unseparated clumps of large numbers of fibers, and the like. Also by definition, gravity-laid inorganic fiber webs contain substantially no organic filler, organic filler being defined herein as meaning shredded fabric textile materials, rubber residue or any other material from rubber tires, and the like. (This proviso does not preclude the presence of any the aforementioned organic binders, whether in the form of fibers, powders, latex, etc.).

Inorganic fibers used in the methods and articles disclosed herein may include any such fibers that are capable of meeting the performance criteria required of a particular application. Such inorganic fibers may be chosen e.g. from refractory ceramic fibers, biosoluble ceramic fibers, glass fibers, polycrystalline inorganic fibers, mineral wool (rock wool), basalt fibers and the like. A particular type of inorganic fiber may be used singly; or, at least two or more inorganic fibers of different types may be used in combination.

In some embodiments, the inorganic fibers may comprise ceramic fibers. For example, refractory ceramic fibers may be suitable for certain applications. Suitable refractory ceramic fibers are available from a number of commercial sources and include these known under the trade designations "FIBER-FRAX" from Unifrax, Niagara Falls, N.Y., "CERAFIBER" and "KAOWOOL" from Thermal Ceramics Co., Augusta, Ga.; "CER-WOOL" from Premier Refractories Co., Erwin, Tenn.; and "SNSC" from Shin-Nippon Steel Chemical, Tokyo, Japan.

Some ceramic fibers which may be useful include polycrystalline oxide ceramic fibers such as mullites, alumina, high alumina aluminosilicates, aluminosilicates, zirconia, titania, chromium oxide and the like. Particular fibers of this type include high alumina, crystalline fibers, which comprise aluminum oxide in the range from about 67 to about 98% by weight and silicon oxide in the range from about 33 to about 2% by weight. These fibers are commercially available, for example, under the trade designation "NEXTEL 550" from the 3M Company, "SAFFIL" available from Dyson Group PLC, Sheffield, UK, "MAFTEC" available from Mitsubishi Chemical Corp., Tokyo, Japan) "FIBERMAX" from Unifrax, Niagara Falls, N.Y., and "ALTRA" from Rath GmbH, Germany.

Suitable polycrystalline oxide ceramic fibers further include aluminoborosilicate fibers preferably comprising aluminum oxide in the range from about 55 to about 75% by weight, silicon oxide in the range from less than about 45 to greater than zero (preferably, less than 44 to greater than zero) % by weight, and boron oxide in the range from less than 25 to greater than zero (preferably, about 1 to about 5) % by weight (calculated on a theoretical oxide basis as $Al_2O_3$, $SiO_2$, and $B_2O_3$, respectively). Such fibers preferably are at least 50% by weight crystalline, more preferably, at least 75%, and most preferably, about 100% (i.e., crystalline fibers). Aluminoborosilicate fibers are commercially available, for example, under the trade designations "NEXTEL 312" and "NEXTEL 440" from the 3M Company.

In some embodiments, the inorganic fibers may comprise ceramic fibers that are obtained from a sol-gel process, in which the fibers are formed by spinning or extruding a solution or dispersion or a generally viscous concentrate of the constituting components of the fibers or precursors thereof. In some embodiments, the inorganic fibers used may comprise heat treated ceramic fibers, sometimes called annealed ceramic fibers, e.g. as disclosed in U.S. Pat. No. 5,250,269.

A particular type of ceramic fiber may be used singly; or, at least two or more ceramic fibers of different types may be used in combination. In various embodiments, the ceramic fibers may be blended with any other desired inorganic fibers or organic fibers, including biosoluble fibers, glass fibers, basalt fibers, mineral wool fibers, inorganic binders, bicomponent fibers, and so on.

In some embodiments, the inorganic fibers may comprise biosoluble fibers (also known as body-soluble fibers), e.g. biosoluble ceramic fibers. In some embodiments, substantially all of the inorganic fibers of the web are biosoluble ceramic fibers. In further embodiments, substantially all of the fibers of the web are biosoluble ceramic fibers. As used herein, biosoluble fibers refers to fibers that are decomposable in a physiological medium or a simulated physiological medium. Typically, biosoluble fibers are soluble or substantially soluble in a physiological medium within about 1 year. As used herein, the term "substantially soluble" refers to fibers that are at least about 75 weight percent dissolved. Another approach to estimating the biosolubility of fibers is based on the composition of the fibers. For example, Germany proposed a classification based on a carcinogenicity index (KI value). The KI value is calculated by a summation of the weight percentages of alkaline and alkaline-earth oxides and subtraction of two times the weight percent of aluminum oxide in inorganic oxide fibers. Inorganic fibers that are biosoluble typically have a KI value of about 40 or greater.

Biosoluble inorganic fibers suitable for use in the present invention may include inorganic oxides such as, for example, $Na_2O$, $K_2O$, $CaO$, $MgO$, $P_2O_5$, $Li_2O$, $BaO$, or combinations thereof with silica. Other metal oxides or other ceramic constituents can be included in the biosoluble inorganic fibers even though these constituents, by themselves, lack the desired solubility but are present in low enough quantities such that the fibers, as a whole, are still decomposable in a physiological medium. Such metal oxides include, for example, $Al_2O_3$, $TiO_2$, $ZrO_2$, $B_2O_3$, and iron oxides. The biosoluble inorganic fibers can also include metallic components in amounts such that the fibers are decomposable in a physiological medium or simulated physiological medium.

In one embodiment, the biosoluble inorganic fibers include oxides of silica, magnesium, and calcium. These types of biosoluble ceramic fibers may be referred to e.g. as calcium magnesium silicate fibers, or as alkaline earth silicate wools, and so on. The calcium magnesium silicate fibers usually contain less than about 10 weight % aluminum oxide. In some embodiments, the fibers include from about 45 to about 90 weight % $SiO_2$, up to about 45 weight % CaO, up to about 35 weight % MgO, and less than about 10 weight % $Al_2O_3$. For example, the fibers can contain about 55 to about 75 weight % $SiO_2$, about 25 to about 45 weight 30% CaO, about 1 to about 10 weight % MgO, and less than about 5 weight % $Al_2O_3$.

In a further embodiment, the biosoluble inorganic fibers include oxides of silica and magnesia. These types of fibers may be referred to as magnesium silicate fibers. The magnesium silicate fibers usually contain from about 60 to about 90 weight % $SiO_2$, up to about 35 weight % MgO (typically, from about 15 to about 30 weight % MgO), and less than about 5 weight % $Al_2O_3$. For example, the fibers can contain about 70 to about 80 weight % $SiO_2$, about 18 to about 27 weight % MgO, and less than about 4 weight % of other trace elements. Suitable biosoluble inorganic oxide fibers are described e.g. in U.S. Pat. No. 5,332,699 (Olds et al.); U.S. Pat. No. 5,585,312 (Ten Eyck et al.); U.S. Pat. No. 5,714,421 (Olds et al.); and U.S. Pat. No. 5,874,375 (Zoitas et al.). Various methods can be used to form biosoluble inorganic fibers including, but not limited to, sol gel formation, crystal growing processes, and melt forming techniques such as spinning or blowing. Biosoluble fibers are commercially available, for example, from Unifrax Corporation, Niagara Falls, N.Y., under the trade designations "ISOFRAX" and "INSULFRAX," under the trade designations "SUPERMAG 1200" from Nutec Fibratec, Monterrey, Mexico, and Thermal Ceramics, Augusta, Ga., under the trade designation "SUPERWOOL." "SUPERWOOL 607" biosoluble fibers, for example, contain 60 to 70 weight % $SiO_2$, 25 to 35 weight % CaO, 4 to 7 weight % MgO, and a trace amount of $Al_2O_3$. "SUPERWOOL 607 MAX" biosoluble fibers, for example, which can be used at a slightly higher temperature, contain 60 to 70 weight % $SiO_2$, 16 to 22 weight % CaO, 12 to 19 weight % MgO, and a trace amount of $Al_2O_3$.

In various embodiments, if present in the inorganic fiber web, biosoluble ceramic fibers may make up at least about 20 weight %, at least about 50 weight %, at least about 80 weight %, at least about 90 weight %, or at least about 95 weight %, of the inorganic fibers of the web. A particular type of biosoluble fiber may be used singly; or, at least two or more biosoluble fibers of different types may be used in combination. In some embodiments, the biosoluble ceramic fibers may be long fibers (i.e., at least about 5 cm in length). In various embodiments, biosoluble ceramic fibers may be blended with any other desired inorganic fibers or organic fibers, including refractory ceramic fibers, glass fibers, basalt fibers, mineral wool fibers, inorganic binders, bicomponent fibers, and so on. Gravity-laid inorganic fiber web compositions utilizing biosoluble ceramic fibers are discussed in further detail in U.S. Provisional Patent Application Ser. No. 61/323,526, titled INORGANIC FIBER WEBS COMPRISING BIOSOLUBLE CERAMIC FIBERS, AND METHODS OF MAKING AND USING, filed Apr. 13, 2010, which is herein incorporated by reference.

In some embodiments, the inorganic fibers may comprise glass fibers. In particular embodiments, the inorganic fibers may comprise magnesium aluminum silicate glass fibers. Examples of magnesium aluminum silicate glass fibers that can be used include glass fibers having between 10% and 30% by weight of aluminum oxide, between 52 and 70% by weight of silicon oxide and between 1% and 12% of magnesium oxide (based on the theoretical amount of $Al_2O_3$, $SiO_2$, and MgO). It will further be understood that the magnesium aluminum silicate glass fiber may contain additional oxides, for example sodium or potassium oxides, boron oxide and calcium oxide. Particular examples of magnesium aluminum silicate glass fibers include E-glass fibers which typically have a composition of about 55% of $SiO_2$, 15% of $Al_2O_3$, 7% of $B_2O_3$, 19% of CaO, 3% of MgO and 1% of other oxides; S and S-2 glass fibers which typically have a composition of about 65% of $SiO_2$, 25% of $Al_2O_3$ and 10% of MgO and R-glass fibers which typically have a composition of 60% of $SiO_2$, 25% of $Al_2O_3$, 9% of CaO and 6% of MgO. E-glass, S-glass and S-2 glass are available for example from Advanced Glassfiber Yarns LLC and R-glass is available from Saint-Gobain Vetrotex. The glass fibers may be chopped glass fibers, and may be generally free of shot, i.e. having not more than 5% by weight of shot. In some embodiments, heat treated glass fibers may be used. A particular type of glass fiber may be used singly; or, at least two or more glass fibers of different types may be used in combination. In various embodiments, the glass fibers may be blended with any other desired inorganic fibers or organic fibers, including ceramic fibers, biosoluble fibers, basalt fibers, mineral wool fibers, inorganic binders, bicomponent fibers, and so on.

In some embodiments, the inorganic fibers may comprise basalt fibers, typically made by melting and extruding basalt rock to form fibers. Because the fibers are derived from a mineral, the composition of the fibers can vary but generally has a composition, by weight, of about 45 to about 55% $SiO_2$, about 2 to about 6% alkalis, about 0.5 to about 2% $TiO_2$, about 5 to about 14% FeO, about 5 to about 12% MgO, at least about 14% by weight $Al_2O_3$, and often nearly about 10% CaO. The fibers are often shot free, or contain a very low amount of shot (typically less than 1% by weight). In various embodiments, the long basalt fibers may have e.g. an average diameter of from about 1 micron to about 50 microns, from about 2 to about 14 microns, or from about 4 to about 10 microns. Often, basalt fibers have diameters in a range from 5 to 22 microns.

The fibers may be generally continuous as made, and/or can be chopped to desired lengths, with the term long basalt fibers used herein to designate basalt fibers of at least about 5 cm in length. Such long basalt fibers are commercially available, for example, from Sudaglass Fiber Technology, Houston, Tex., and Kamenny Vek, Dubna, Russia. Because of their length, long basalt fibers may advantageously enhance the strength of the inorganic fiber web, while providing higher temperature resistance than e.g. glass fibers, and while being less brittle e.g. than some ceramic fibers. In various embodiments, the long basalt fibers may be blended with any other desired inorganic fibers or organic fibers, including ceramic fibers, biosoluble fibers, glass fibers, mineral wool fibers, inorganic binders, bicomponent fibers, and so on. In various embodiments, if present in the web, long basalt fibers may make up at least about 2 weight %, at least about 5 weight %, or at least about 10 weight %, of the inorganic fibers of the web. In further embodiments, long basalt fibers may make up at most about 90 weight %, at most about 70 weight %, or at most about 50 weight %, of the inorganic fibers of the web. In still further embodiments, substantially all of the inorganic fibers of the web are basalt fibers. Gravity-laid inorganic fiber web compositions comprising basalt fibers are discussed in further detail in U.S. Provisional Patent Application Ser. No. 61/323,531, titled INORGANIC FIBER WEBS COMPRISING LONG BASALT FIBERS, AND METHODS OF MAKING AND USING, filed Apr. 13, 2010, which is herein incorporated by reference.

In some embodiments, the inorganic fibers may comprise mineral wool, also known as rockwool or slag wool. Mineral wool is available from a variety of sources, e.g., the Rock Wool Manufacturing Co., Leeds, Ala. Such material may be made e.g. from reprocessed slag, and is typically available at rather short fiber lengths (e.g., one centimeter or less). Because of its generally short fiber length, it may be helpful to blend mineral wool with long inorganic fibers of at least 5 cm in length (e.g., long basalt fibers, long glass fibers, long biosoluble fibers, and/or long ceramic fibers, if available), and/or with organic or inorganic binders. In various embodiments, if present in the web, mineral wool fibers may make up at least about 30 weight %, at least about 50 weight %, or at least about 80 weight %, of the inorganic fibers of the web. In further embodiments, mineral wool fibers may make up at most about 100 weight %, at most about 90 weight %, or at most about 85 weight %, of the inorganic fibers of the web.

Inorganic fibers in any or all of the above-mentioned general categories, and specific types and compositions, may be used singly, or in combination with one or more of the other inorganic fibers mentioned herein, in the gravity-laid inorganic fiber web disclosed herein. Additionally, any or all of the inorganic fibers mentioned herein, singly or in combination, may be used with one or more of the inorganic binders and/or organic binders mentioned herein.

In various embodiments, the inorganic fibers may have e.g. an average diameter of from about 1 micron to about 50 microns, from about 2 to about 14 microns, or from about 4 to about 10 microns. In various embodiments, the inorganic fibers may have an average length of from about 0.01 mm to 100 cm, from about 1 mm to about 30 cm, or from about 0.5 cm to about 10 cm. In particular embodiments, at least some of the inorganic fibers may be long inorganic fibers, meaning at least about 5 cm in length. Such long inorganic fibers may be particularly useful when it is desired to at least partially consolidate the inorganic fiber web by needle-punching. In some embodiments, fibers having a different average length may be combined in a blend. In particular embodiments, a gravity-laid inorganic fiber web may be made with a blend of short (i.e. about 1 cm or less) and long (i.e. about 5 cm or more) inorganic fibers. The short fibers and the long fibers may comprise the same composition; or the short fibers may be comprised of one material (e.g., short ceramic fibers, mineral wool, etc.) and the long fibers may be comprised of another material (e.g., long biosoluble ceramic fibers, long basalt fibers, long glass fibers, etc.)

The thick gravity-laid inorganic fiber web may contain any suitable inorganic particulate additive(s), which may be introduced into forming chamber 2 and blended (e.g., generally uniformly blended) with inorganic fibers 3 and held within consolidated fiber web 10 (e.g., bonded to inorganic fibers 3), by the methods disclosed earlier herein. In various embodiments, such additives may be introduced into forming chamber 2 in dry form along with fibers 3 (e.g., through fiber input device 31), or may be separately introduced into forming chamber 2 in dry form, (e.g., through particle input device 22). In other embodiments, such additives may be introduced into forming chamber 2 while carried (e.g., as a suspension, solution, dispersion, latex, etc.) by a liquid carrier. Such a liquid carrier may be sprayed onto the fibers before the fibers are introduced into forming chamber 2 (e.g., by way of liquid spray unit 32). Or, such a liquid carrier may be sprayed directly into forming chamber 2. The carrier liquid may be removed from mat 6, e.g. by evaporation, e.g. as assisted by passage through an oven or the like. If particulate additives 21 are introduced into forming chamber 2 in dry form, it may be desired to introduce a liquid (e.g., water) into forming chamber 2 (whether by depositing it onto fibers 3, or by spraying it into forming chamber 2) to enhance the dispersing and contacting of particulate additives 21 with fibers 3.

In various embodiments, the inorganic particulate additive(s) may have an average particle size of at least about 0.1 micron, at least about 0.5 micron, at least about 1.0 micron, or at least about 2.0 micron. In further embodiments, the inorganic particulate additive(s) may have an average particle size of at most about 1000 microns, at most about 500 microns, at most about 200 microns, at most about 100 microns, at most about 100 microns, at most about 50 microns, or at most about 10 microns.

In various embodiments, the inorganic particulate additive(s) comprise one or more intumescent additives, one or more endothermic additives, one or more insulative additives, and mixtures thereof.

In some embodiments, the inorganic particulate additive(s) may comprise one or more inorganic intumescent additives. Useful intumescent materials for use in making an intumescent web include, but are not limited to, expandable vermiculite, treated expandable vermiculite, partially dehydrated expandable vermiculite, expandable perlite, expandable graphite, expandable hydrated alkali metal silicate (for example, expandable granular sodium silicate, e.g. of the general type described in U.S. Pat. No. 4,273,879, and available e.g. under the trade designation "EXPANTROL" from 3M Company, St. Paul, Minn.), and mixtures thereof. (In this context, graphite is considered to be inorganic). An example of a particular commercially available intumescent additive is expandable graphite flake, available under the trade designation GRAFGUARD Grade 160-50, from UCAR Carbon Co., Inc., Cleveland, Ohio. In various embodiments, the intumescent additive(s) may be present at zero, at least about 2%, at least about 5%, at least about 10%, at least about 20%, or at least about 30% by weight, based on the total weight of the inorganic fiber web. In further embodiments, the intumescent additive(s) may be present at most about 80%, at most about 60%, or at most about 50% by weight, based on the total weight of the inorganic fiber web. The intumescent additive(s) may be combined with any suitable inorganic fiber, including e.g. ceramic fibers, biosoluble fibers, glass fibers, mineral wool, basalt fibers and so on.

In some embodiments, the inorganic particulate additive(s) may comprise one or more inorganic endothermic additives. Suitable endothermic additives may include e.g. any inorganic compound capable of liberating water (e.g., water of hydration) e.g. at temperatures of between 200° C. and 600° C. Suitable endothermic additives may thus include materials such as alumina trihydrate, magnesium hydroxide, and the like. A particular type of endothermic additive may be used singly; or, at least two or more endothermic additives of different types may be used in combination. In various embodiments, the endothermic additive(s) may be present at zero, at least about 2, at least about 5, at least about 10, at least about 20, or at least about 30% by weight, based on the total weight of the inorganic fiber web. The endothermic additive(s) may be combined with any suitable inorganic fiber, including e.g. ceramic fibers, biosoluble fibers, glass fibers, mineral wool, basalt fibers and so on, and may also be combined with any suitable intumescent additive(s).

In some embodiments, the inorganic particulate additive(s) may comprise one or more inorganic insulative additives. Suitable insulative additives may include e.g. any inorganic compound that, when present in the inorganic fiber web, can increase the thermal insulating properties of the web, e.g. without unacceptably increasing the weight or density of the web. Inorganic particulate additives that comprise relatively high porosity may be particularly suitable for these purposes. Suitable insulative additives may include materials such as fumed silica, precipitated silica, diatomaceous earth, Fuller's earth, expanded perlite, silicate clays and other clays, silica gel, glass bubbles, ceramic microspheres, talc and the like. (Those of ordinary skill will appreciate that there may not be a clear dividing line between insulative additives and e.g. certain endothermic or intumescent additives). A particular type of insulative additive may be used singly; or, at least two or more insulative additives of different types may be used in combination. In various embodiments, the insulative additive(s) may be present at zero, at least about 5, at least about 10, at least about 20, at least about 40, or at least about 60% by weight, based on the total weight of the inorganic fiber web. The insulative additive(s) may be combined with any suitable inorganic fiber, including e.g. ceramic fibers, biosoluble fibers, glass fibers, mineral wool, basalt fibers and so on, and may also be combined with any suitable intumescent additive(s) and/or endothermic additive(s).

Those of ordinary skill in the art will appreciate that the present methods enable the manufacturing of a variety of thick gravity-laid inorganic fiber webs comprising a variety of fiber compositions and fiber properties (e.g., fiber diameter and/or length), in various combinations with any of the binders, intumescent additives, endothermic additives, and/or insulative additives mentioned herein. Any of the gravity-laid inorganic fiber webs as disclosed herein may be used in a variety of fire-protective applications.

Figure 3:
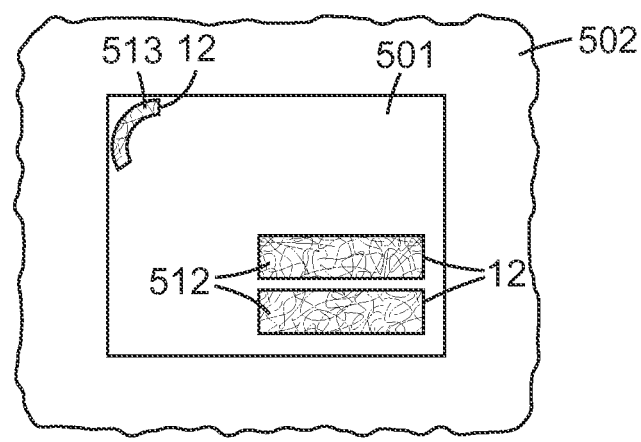
FIG. 3 shows a schematic front view of exemplary fire-protective articles comprising gravity-laid inorganic fiber webs, positioned in a through-penetrating opening.

In some embodiments of the type shown in exemplary manner in FIG. 3, a thick gravity laid-inorganic fiber web can be formed into a fire-protective article 12 that can be at least partially inserted into a through-penetrating opening 501 (e.g., in a partition 502 such as a wall or ceiling of a building) so as to enhance the fire-protecting of the opening. Such a fire-protective article might be used singly, or as a combination of several such articles (as in FIG. 3), and/or in combination with other fire-protective equipment (such as sleeves, collars, fittings, covers, caulks, mastics, and the like). In some embodiments, such a fire-protective article may be a fire-protective pillow 512, e.g. of the general type exemplified by the product available from 3M Company under the trade designation 3M FIRE BARRIER PILLOW. In other embodiments, such a fire-protective article may be a fire-protective packing material, e.g. that might be stuffed into a through-penetrating opening in loose or irregular form rather than as a pillow.

Figure 4:
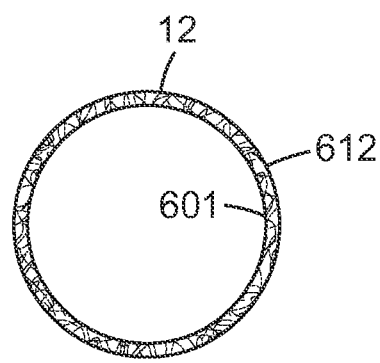
FIG. 4 shows a schematic front view of an exemplary fire-protective article comprising a gravity-laid inorganic fiber web, wrapped around an elongated object.

In some embodiments of the type shown in exemplary manner in FIG. 4, a thick gravity-laid inorganic fiber web can be formed into a fire-protective article 12 that may be at least partially wrapped around an elongated object such as a duct 601, so as to enhance the fire-protecting of the object. In some embodiments, fire-protective article 12 may be a fire-protective flexible blanket 612 e.g., of the general type exemplified by the product available from 3M Company under the trade designation 3M FIRE BARRIER DUCT WRAP 615. Although discussed herein primarily with reference to being wrapped around a single elongated object, such fire-protective articles might also be wrapped around a collection of generally aligned elongated objects. Those of ordinary skill in the art will appreciate that thick gravity-laid inorganic fiber webs with particular compositions and/or properties may be particularly suited for certain fire-protective applications. While not meant to be exhaustive or limiting, some of these will now be discussed.

When serving as a packing material or as a flexible blanket, in some embodiments the thick inorganic fiber web may comprise one or more inorganic particulate additives, e.g., intumescent additive(s), endothermic additive(s), insulative additive(s), or mixtures thereof. In particular embodiments, the intumescent additive comprises expandable graphite. In some embodiments, an organic binder or an inorganic binder may be used to enhance the holding of the inorganic particulate additive in the web. In some embodiments the inorganic fiber web may comprise less than about 5% organic binder, less than about 2% organic binder, less than about 1% in organic binder, less than about 0.5% organic binder, less than about 0.2% organic binder, or may contain substantially no organic binder (in all cases the inorganic fiber web not having any polymeric organic fibers excepting any present as binder). In some embodiments the inorganic fibers may comprise a blend of mineral wool with glass fibers and/or with basalt fibers. In some embodiments the inorganic fibers may comprise a blend of ceramic fibers with glass fibers and/or with basalt fibers. In some embodiments the inorganic fibers may comprise at least some biosoluble ceramic fibers. In further embodiments, substantially all of the inorganic fibers of the web are biosoluble ceramic fibers. In some embodiments, the inorganic fiber web and the packing material comprised thereof, are hand-tearable. In some embodiments, a fire-protective flexible blanket comprised of the thick inorganic fiber web may be encapsulated within a metal-containing facing (e.g., a metal foil, a metallized Mylar, or the like).

When serving as a pillow, in some embodiments the thick inorganic fiber web may comprise one or more inorganic particulate additives, e.g., intumescent additive(s), endothermic additive(s), insulative additive(s), or mixtures thereof. In particular embodiments, the intumescent additive comprises expandable graphite (in other embodiments, the inorganic fiber contains substantially no graphite). In some embodiments, the intumescent additive consists of expandable granular sodium silicate. In some embodiments, the intumescent additive comprises vermiculite. In some embodiments, an organic binder or an inorganic binder may be used to enhance the holding of the inorganic particulate additive in the web. In some embodiments, the inorganic fibers may comprise a blend of mineral wool with glass fibers or basalt fibers. In some embodiments the inorganic fibers may comprise a blend of ceramic fibers with glass fibers or basalt fibers. In some embodiments the inorganic fibers may comprise at least some biosoluble ceramic fibers. In further embodiments, substantially all of the inorganic fibers of the web are biosoluble ceramic fibers. In some embodiments, multiple pillows may be used to enhance the fire-protection of a through-penetration. In particular embodiments, such pillows may be attachable to each other. In any of the above uses (e.g., pillow, packing material, flexible blanket), the thick inorganic fiber web may be a needle-punched web. In specific embodiments, the web is consolidated only by needle-punching and not by the use of any binder.

In a fire-protective article in which the inorganic fiber web contains one or more intumescent additives, in various embodiments the inorganic fiber web may be capable, upon exposure to sufficiently high temperature, of expanding in thickness at least 50%, 100%, or 200% (although the actual expansion in use may be limited by the space available for such expansion).

In some embodiments, the methods disclosed herein may be used in combination with methods of melt-forming inorganic fibers, e.g. biosoluble ceramic fibers. Such methods are discussed in further detail in U.S. Provisional Patent Application Ser. No. 61/323,416, titled METHODS OF MAKING INORGANIC FIBER WEBS, filed Apr. 13, 2010, which is herein incorporated by reference.

LIST OF EXEMPLARY EMBODIMENTS

Embodiment 1. A method of making a gravity-laid inorganic fiber web, comprising: introducing inorganic fibers into a forming chamber that comprises a plurality of fiber-separating rollers provided in at least one row within the forming chamber and that comprises a moving endless belt screen; mechanically separating at least some of the inorganic fibers with the fiber-separating rollers; capturing any remaining agglomerates of the inorganic fibers by the moving endless belt screen and returning the captured agglomerates to the fiber-separating rollers to be mechanically separated by the fiber-separating rollers; collecting the mechanically separated inorganic fibers as a gravity-laid inorganic fiber mat; removing the gravity-laid inorganic fiber mat from the forming chamber; and, consolidating the gravity-laid inorganic fiber mat to form a monolithic gravity-laid inorganic fiber web of greater than about 5 cm in thickness.

Embodiment 2. The method of embodiment 1 wherein the thickness of the gravity-laid inorganic fiber web is at least about 60% of the thickness of the gravity-laid inorganic fiber mat.

Embodiment 3. The method of embodiment 1 wherein the thickness of the gravity-laid inorganic fiber web is at least about 80% of the thickness of the gravity-laid inorganic fiber mat.

Embodiment 4. The method of embodiment 1 wherein the thickness of the gravity-laid inorganic fiber web is at least about 90% of the thickness of the gravity-laid inorganic fiber mat.

Embodiment 5. The method of embodiment 1 wherein the thickness of the gravity-laid inorganic fiber web is at least about 95% of the thickness of the gravity-laid inorganic fiber mat.

Embodiment 6. The method of any of embodiments 1-5 wherein the method comprises introducing inorganic fibers of at least two different types into the forming chamber and blending the fibers within the forming chamber so as to collect a gravity-laid inorganic fiber mat that comprises a blend of the at least two different types of inorganic fibers.

Embodiment 7. The method of any of embodiments 1-3 and 6 further comprising adding at least one binder to the inorganic fibers or to the gravity-laid inorganic fiber mat and wherein the consolidation is performed by activating the binder.

Embodiment 8. The method of embodiment 7 wherein the thickness of the gravity-laid inorganic fiber web is at least 90% of the thickness of the gravity-laid inorganic fiber mat.

Embodiment 9. The method of embodiment 7 wherein the binder is an organic binder and wherein the consolidation comprises heating the gravity-laid inorganic fiber mat to a temperature sufficient to activate the organic binder.

Embodiment 10. The method of embodiment 7 wherein the binder is delivered in a liquid and wherein the consolidation comprises removing at least a portion of the liquid to activate the binder.

Embodiment 11. The method of embodiment 7 wherein the binder is an inorganic binder.

Embodiment 12. The method of embodiment 1 wherein the consolidation comprises needle-punching the gravity-laid inorganic fiber mat in such a manner that the thickness of the gravity-laid inorganic fiber web is at least 60% of that of the gravity-laid inorganic fiber mat.

Embodiment 13. The method of embodiment 12 wherein the gravity-laid inorganic fiber mat is needle-punched from both major sides of the gravity-laid inorganic fiber mat.

Embodiment 14. The method of any of embodiments 1-13 further comprising introducing at least one inorganic particulate additive into the forming chamber and blending the additive with the inorganic fibers.

Embodiment 15. The method of embodiment 14 wherein the inorganic particulate additive comprises an intumescent additive.

Embodiment 16. The method of any of embodiments 14-15 wherein the inorganic particulate additive comprises an endothermic additive comprising an inorganic compound capable of liberating water at temperatures of between 200° C. and 600° C.

Embodiment 17. The method of any of embodiments 14-16 wherein the inorganic particulate additive comprises an insulative additive.

Embodiment 18. The method of any of embodiments 14-17 further comprising introducing at least one binder into the forming chamber and blending the binder with the inorganic fibers and the inorganic particulate additive, and wherein the consolidation serves to bind the inorganic particulate additive within the inorganic fiber web by way of the binder.

Embodiment 19. The method of any of embodiments 1-18 comprising adding at least one binder to the inorganic fibers or to the gravity-laid inorganic fiber mat and wherein the gravity-laid inorganic fiber mat is consolidated by needle-punching followed by activating the binder.

Embodiment 20. The method of embodiment 19 wherein the needle-punching penetrates only partially into the gravity-laid inorganic fiber mat, so that the gravity-laid inorganic fiber web comprises surface layers that are proximal to the major surfaces of the gravity-laid inorganic fiber web and that are consolidated by the combination of the binder and needle-punching, and so that the gravity-laid inorganic fiber web comprises an interior layer that is distal to the major surfaces of the gravity-laid inorganic fiber web and that is consolidated only by the binder.

Embodiment 21. A monolithic gravity-laid inorganic fiber web that is greater than about 5 cm in thickness.

Embodiment 22. The inorganic fiber web of embodiment 21 wherein at least some of the inorganic fibers of the web are long inorganic fibers of at least 5 cm in length.

Embodiment 23. The inorganic fiber web of any of embodiments 21-22 wherein the web is a blended fiber web comprising a blend of at least two types of inorganic fibers.

Embodiment 24. The inorganic fiber web of any of embodiments 21-23 wherein from about 20% to about 100% by weight of the inorganic fibers of the web are biosoluble ceramic fibers.

Embodiment 25. The inorganic fiber web of any of embodiments 21-22 wherein substantially all of the inorganic fibers of the web are biosoluble ceramic fibers.

Embodiment 26. The inorganic fiber web of any of embodiments 21-24 wherein at least about 5% by weight of the inorganic fibers of the web are long basalt fibers.

Embodiment 27. The inorganic fiber web of any of embodiments 21-24 and 26 wherein the web comprises mineral wool blended with long inorganic fibers chosen from the group consisting of long glass fibers and long basalt fibers and mixtures thereof, wherein from about 40% to about 95% by weight of the inorganic fibers of the web are mineral wool fibers, and wherein from about 5% to about 60% of the inorganic fibers of the web are long inorganic fibers.

Embodiment 28. The inorganic fiber web of any of embodiments 21-27 wherein the web comprises an organic binder.

Embodiment 29. The inorganic fiber web of embodiment 28 wherein the organic binder comprises bicomponent organic polymeric fibers present at from about 0.5% to about 5% by weight based on the total weight of the inorganic fiber web.

Embodiment 30. The inorganic fiber web of any of embodiments 21-27 wherein the web contains substantially no organic binder.

Embodiment 31. The inorganic fiber web of any of embodiments 21-30 wherein the web comprises an inorganic binder.

Embodiment 32. The inorganic fiber web of any of embodiments 21-31 wherein the web is a needle-punched web.

Embodiment 33. The inorganic fiber web of any of embodiments 21-32 wherein the web comprises an inorganic particulate additive.

Embodiment 34. The inorganic fiber web of embodiment 33 wherein the inorganic particulate additive comprises an intumescent additive.

Embodiment 35. The inorganic fiber web of embodiment 34 wherein the intumescent additive comprises expandable graphite.

Embodiment 36. The inorganic fiber web of embodiment 35 wherein the web comprises intumescent expandable graphite at from about 10% to about 50% by weight based on the total weight of the inorganic fiber web.

Embodiment 37. The inorganic fiber web of any of embodiments 34-36 wherein the intumescent additive comprises expandable sodium silicate.

Embodiment 38. The inorganic fiber web of any of embodiments 33-37 wherein the inorganic particulate additive comprises an endothermic additive comprising an inorganic compound capable of liberating water at temperatures of between 200° C. and 600° C.

Embodiment 39. The inorganic fiber web of embodiment 38 wherein the web comprises an endothermic additive at from about 10% to about 50% by weight based on the total weight of the inorganic fiber web.

Embodiment 40. The inorganic fiber web of any of embodiments 33-39 wherein the inorganic particulate additive comprises an insulative additive.

Embodiment 41. The inorganic fiber web of any of embodiments 21-33 and 38-40 wherein the web contains substantially no intumescent additive.

Embodiment 42. The inorganic fiber web of any of embodiments 21-41 wherein the web comprises a binder and is needle-punched, such that the web comprises surface layers that are proximal to major surfaces of the web and that are consolidated by the combination of the binder and needle-punching, and such that the web further comprises an interior layer that is distal to the major surfaces of the web and that is consolidated only by the binder.

Embodiment 43. A method of enhancing the fire-protecting of a through-penetrating opening in a partition, the method comprising: inserting at least one article comprising the gravity-laid inorganic fiber web of any of embodiments 21-42 at least partially into the through-penetrating opening.

Embodiment 44. The method of embodiment 43 wherein the article is a fire-protective pillow.

Embodiment 45. The method of embodiment 44 comprising inserting a plurality of the articles at least partly into the through-penetrating opening.

Embodiment 46. The method of embodiment 45 wherein the articles are attachable to each other.

Embodiment 47. A method of enhancing the fire-protecting of an elongated object or a collection of elongated generally-aligned objects, the method comprising: wrapping at least one an article comprising the gravity-laid inorganic fiber web of any of embodiments 21-42 at least partially circumferentially around the object or collection of objects, along at least a portion of the elongated length of the object or collection of objects.

Embodiment 48. The method of embodiment 47 wherein the article is a fire-protective flexible blanket.

Embodiment 49. The method of embodiment 48 wherein the elongated object is a duct and wherein the flexible blanket is placed in contact with the duct and is wrapped completely circumferentially around the duct along at least a portion of the elongated length of the duct.

Embodiment 50. The method of embodiment 49 wherein the flexible blanket is encapsulated within a metal-containing facing.

Embodiment 51. The method of embodiment 47 wherein the elongated object or collection of elongated, generally-aligned objects comprises one or more cables, wires, pipes, raceways, cable trays, conduits, shrouds, or beams of structural steel, and wherein the article is a fire-protective flexible strip.

Embodiment 52. The method of embodiment 51 wherein the flexible strip is in contact with at least a portion of the elongated object or at least a portion of at least one of the elongated objects of the collection of elongated objects.

Embodiment 53. The method of embodiment 51 wherein the flexible strip comprises a metal-containing facing.

Embodiment 54. The method of embodiment 51 wherein the flexible strip comprises an adhesive-comprising facing.

EXAMPLES

Examples of thick gravity-laid inorganic fiber webs of various compositions and of at least about 5 cm in thickness, are found in Examples 1-6 and 10. Examples 7-9, while not showing inorganic fiber webs of at least 5 cm in thickness, are included to demonstrate the use of needle-punching with minimal reduction in the thickness of the thus-formed web from the as-deposited thickness of the inorganic fiber mat.

Example 1

An apparatus was used of the general type depicted in FIG. 1. The apparatus comprised a forming chamber with two rows of fiber-separating rotating (spike) rolls arranged near each other in the upper part of the chamber and with two rows of spike rolls arranged near each other in the lower part of the chamber, in similar manner as shown in FIG. 1. Each row contained five spike rolls. An endless belt ran around the interior of the chamber, passing between the upper and lower sets of spike roll rows, in similar manner as shown in FIG. 1. The belt comprised solid metal slats with their long axis oriented transversely to the direction of movement of the belt, spaced so as to provide transversely-extending through-holes of width approximately one inch (in the direction of movement of the belt). The bottom of the forming chamber comprised an area approximately 75 cm long (in the direction of motion of the formed fiber mat) and approximately 60 cm wide. A carrier (an endless, air-permeable belt) was arranged to pass horizontally along the bottom of the forming chamber. The carrier was approximately 60 cm wide, to generally match the width of the bottom of the forming chamber, and was movable in the direction of the long axis of the bottom of the forming chamber. A disposable, air-permeable paper (of basis weight in the range of approximately 18 grams per square meter) was placed on the top surface of the carrier.

Biosoluble ceramic fibers were obtained from Nutec/Fibratec (Monterrey, Mexico) under the trade designation SMG 1200. The biosoluble ceramic fibers were reported by the supplier to be amorphous calcium-magnesium silicate fibers with a nominal fiber length of approximately 20 cm and a nominal fiber diameter of approximately 3 µm (qualitatively, the fibers as-received appeared to be shorter than the nominal length). Basalt fibers were obtained from Kamenny Vek, of Dubna, Moscow, Russian Federation, under the trade designation BCS13-KV12. The basalt fibers were reported by the supplier to be chopped fibers with a nominal fiber length of approximately 6.4 cm and a nominal fiber diameter of approximately 13 µm. (The basalt fibers were opened by a first pass through the forming chamber, prior to being processed as described below). Expandable graphite was obtained from Nordmann-Rassmann, Hamburg, Germany, under the trade designation NORD-MIN 351. Bicomponent organic polymer (binder) fibers were obtained from Stein Fibers (Albany, N.Y.) under the trade designation 131-00251. The fibers were reported by the supplier to be polyester/copolyester 2 denier fibers of nominal length of 55 mm.

In performing the experiments, fibers were obtained (e.g., as bulk fibers in bales) and appropriate amounts of the fibers were measured out and manually placed on a feed conveyor belt. A water mister was used in the room containing the apparatus, to reduce static electricity for convenience of handling the fibers. The conveyor belt was started into motion and carried the fibers to a fiber feeding station comprising a chamber containing a single set of two spike rollers. The fibers were drawn into the chamber, passed through the set of spike rollers, and were removed from the chamber through a duct, by way of a partial vacuum imparted by blower fans. The fibers were then conveyed to, and injected into, the upper portion of the forming chamber under positive pressure imparted by the blower fans. The ceiling of the forming chamber was porous so that any excess pressure could be bled off. Expandable graphite particles were placed into the hopper of a particle injection unit, which injected the particles into the lower portion of the forming chamber (below the spike rollers) at a rate calibrated to provide the compositions listed below.

The amounts of the various fibers, and of the particles, were controlled so as to form a fibrous mat of nominal composition approximately 25% by weight expandable graphite, approximately 20% by weight basalt, approximately 50% by weight ceramic fibers, and approximately 5% by weight of binder fibers. In the forming chamber, the biosoluble ceramic fibers and the basalt fibers were each mechanically separated, were blended with each other, and were blended with the binder fibers, in similar manner to that described earlier herein. The mechanically-separated and blended fibers were gravity-dropped toward the bottom of the forming chamber (with capture and recirculation of any large agglomerates as described earlier herein) and were blended with the graphite particles, with the blended fibers and particles falling onto the air-permeable paper to form a fiber mat, as the paper moved (atop the carrier) across the bottom of the forming chamber at a speed of approximately 1 meter per minute. A partial vacuum was applied to the underside of the carrier to assist in depositing the materials and in holding the deposited mat on the porous paper. The paper/carrier carried the deposited fiber mat out of the forming chamber. A compression roll was provided at the chamber exit, which momentarily compressed the fiber mat as it exited the chamber. The as-deposited thickness of the fiber mat was estimated to be approximately 8.9 cm.

The fiber mat was fed through an oven at a speed of approximately 1 meter per minute. The oven was maintained at a temperature of approximately 154° C. The length of the oven was approximately 5.5 meters, and the residence time of the fiber mat in the oven was approximately 5.5 minutes. The oven was arranged to direct heated air downward onto the fiber mat, with the mat being on a porous carrier with a partial vacuum applied to the underside of the carrier. In this manner the heated air could be drawn through the fiber mat, thus pinning the mat against the carrier rather than dislodging the fibers, until the fibers were bonded together.

The activation of the binder fiber by the elevated temperature resulted in the consolidation of the fiber mat into a self-supporting web. At the exit of the oven was roll that could be set so as to momentarily compress the web to a desired amount. In this experiment, the roll was set so as not to compress the web. The final thickness of the thus-formed gravity-laid inorganic fiber web was approximately 8.9 cm. The bulk density of the web was approximately 0.021 grams per $cm^3$.

Example 2

Materials and apparatus were used in similar manner as in Example 1, except that no graphite was used (with the remaining fiber ingredients being used in the same ratio as in Example 1). The as-deposited mat thickness and final thickness of the thus-formed web were approximately the same as for Example 1. The bulk density of the web was approximately 0.018 grams per $cm^3$.

Example 3

Materials and apparatus were used in similar manner as in Example 1, except that no graphite was used and the ratio of the remaining components was approximately 20% by weight basalt, approximately 75% by weight ceramic fibers, and approximately 5% by weight organic binder fibers. The oven exit roll did not compress the web as it exited the oven. The as-deposited mat thickness was approximately 15.2 cm and the final thickness of the thus-formed web was approximately 15.2 cm. as for example 1. The bulk density of the web was approximately 0.035 grams per $cm^3$.

Example 4

Materials and apparatus were used in similar manner as in Example 3, except that except that the roll at the oven exit was set to compress the web to approximately 1.2 cm in thickness. The final thickness of the thus-formed web was approximately 7.6 cm. The bulk density of the web was approximately 0.070 grams per $cm^3$.

Example 5

Materials and apparatus were used in similar manner as in Example 1, except that except that no basalt fibers were used and the ratio of the remaining components was approximately 70% by weight ceramic fibers, and approximately 5% by weight organic binder fibers, and approximately 25% by weight graphite. The as-deposited mat thickness was approximately 8.3 cm and the final thickness of the thus-formed web was approximately 8.3 cm. The bulk density of the web was approximately 0.062 grams per $cm^3$.

Example 6

Materials and apparatus were used in similar manner as in Example 5, except that except that no graphite was used and the ratio of the remaining components was approximately 95% by weight ceramic fibers and approximately 5% by weight organic binder fibers. The as-deposited mat thickness was approximately 12.7 cm and the final thickness of the thus-formed web was approximately 12.7 cm. The bulk density of the web was approximately 0.040 grams per cm$^3$.

Example 7

Materials and apparatus were used in similar manner as in Example 1, except that except that no graphite or ceramic fibers were used and the remaining fibers were comprised of approximately 48.7% by weight of long basalt fibers of nominal fiber length of approximately 6.4 cm, approximately 48.7% by weight of short basalt fibers of nominal fiber length of approximately 6.4 mm, and approximately 2.5% by weight organic binder fibers. The as-deposited thickness of the fiber mat was estimated to be approximately 5.4 cm (measured without a 2 kg weight).

The deposited fiber mat was placed on a separate carrier (a cardboard sheet) and was moved to a separate apparatus for needle-punching. The needle-punching unit was manufactured by the Dilo Group, Eberbach, Germany. The fiber mat on the cardboard carrier was fed through the needle-punching unit at a speed of approximately 1.3 m/min. Immediately prior to entering the needle-punching unit, the fiber mat passed between rolls that compressed the fiber mat somewhat from its as-deposited height. The needle-punching unit comprised an array of needles of a type available from Foster Needle, Manitowoc, Wis., under the trade designation FNC 5230685, 15×30×2 CBA F 20 9-7 NK. The needles were provided (in a single topside-punch board) in an array at approximately 6 mm spacing, covering an area extending approximately 15 cm (downweb) and 61 cm (crossweb). As the fiber mat passed through the needle-punching unit it was needle-punched at a rate of approximately 200 strokes per minute. It was estimated that the mat was punched at a density of approximately 7.6 punches per square centimeter. The needles penetrated approximately 2.5-3.2 centimeters into the mat. The needle-punching resulted in the formation of a noticeably densified surface layer. After the needle-punching, the mat was flipped over and passed through the unit again, so that the mat was needle-punched (under the same conditions) from both sides. The two-sided needle-punching resulted in the consolidation of the mat into a self-supporting web. (Even though organic binder fibers were present, the mat was not passed through an oven to activate the binder fibers). The final thickness of the thus-formed gravity-laid inorganic fiber web was approximately 4.8 cm when measured without a 2 kg weight. Thus in this example, the needle-punching resulted in a reduction in the thickness of the fiber mat of approximately 20%.

Example 8

Materials and apparatus were used in similar manner as in Example 7, except that except that graphite was added at an amount estimated to be in the range of 18% by weight of the total web weight, with the long and short basalt fibers and organic binder fibers comprising the balance of the web and being present at the same ratio as in Example 7. The as-deposited thickness of the fiber mat was estimated to be approximately 7.6 cm (measured with a 2 kg weight). The mat was needle-punched in similar manner as for Example 7, and was not passed through an oven. The needle-punching resulted in the consolidation of the mat into a self-supporting web. The final thickness of the thus-formed gravity-laid inorganic fiber web was approximately 4.8 cm when measured with a 2 kg weight. Thus in this example, the needle-punching resulted in a reduction in the thickness of the fiber mat of approximately 37%.

Example 9

Materials and apparatus were used in similar manner as in Example 8 except that except that the inorganic fibers comprised a blended mixture believed to be in the range of approximately 50% by weight E-glass and approximately 50% by weight mineral wool. The E-glass was obtained from Ferguson, Linwood N.C., under the trade designation GF1200. The mineral wool was obtained from Fibrox Technology, Quebec, CA, under the trade designation Fibrox 300. Graphite was added at a ratio that was not recorded but was believed to be in the range of approximately 15% graphite by weight based on the total weight of the web. The as-deposited thickness of the fiber mat was estimated to be approximately 5.1 cm (measured without a 2 kg weight). The needle-punching resulted in the consolidation of the mat into a self-supporting web. The final thickness of the needle-punched gravity-laid inorganic fiber web was approximately 4.8 cm when measured without a 2 kg weight. Thus in this example, the needle-punching resulted in a reduction in the thickness of the fiber mat of approximately 6%.

Example 10

Materials and apparatus were used in similar manner as in Example 2 except that except that the inorganic fibers comprised approximately 100% by weight of mineral wool fibers. Approximately 10% by weight of organic binder fibers were added. No graphite was present. The as-deposited thickness of the fiber mat was estimated to be approximately 10.1 cm.

The fiber mat was fed through an oven as described in Example 2. The roll at the oven exit was set so as to not compress the web. However, the web was rolled up for storage and it was noted that the act of rolling up the web resulted in some permanent compression. The final thickness of the thus-formed gravity-laid inorganic fiber web was approximately 5.8 cm. The bulk density of the web was approximately 0.12 grams per cm$^3$.

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

What is claimed is:

1. A method of making a gravity-laid inorganic fiber web, comprising:

introducing inorganic fibers into a forming chamber that comprises a plurality of fiber-separating rollers provided in at least one row within the forming chamber and that comprises a moving endless belt screen;

mechanically separating at least some of the inorganic fibers with the fiber-separating rollers;

capturing any remaining agglomerates of the inorganic fibers by the moving endless belt screen and returning the captured agglomerates to the fiber-separating rollers to be mechanically separated by the fiber-separating rollers;

collecting the mechanically separated inorganic fibers as a gravity-laid inorganic fiber mat;

removing the gravity-laid inorganic fiber mat from the forming chamber; and, consolidating the gravity-laid inorganic fiber mat to form a monolithic gravity-laid inorganic fiber web of greater than about 5 cm in thickness.

2. The method of claim 1 wherein the thickness of the gravity-laid inorganic fiber web is at least about 60% of the thickness of the gravity-laid inorganic fiber mat.

3. The method of claim 1 wherein the thickness of the gravity-laid inorganic fiber web is at least about 90% of the thickness of the gravity-laid inorganic fiber mat.

4. The method claim 1 wherein the method comprises introducing inorganic fibers of at least two different types into the forming chamber and blending the fibers within the forming chamber so as to collect a gravity-laid inorganic fiber mat that comprises a blend of the at least two different types of inorganic fibers.

5. The method of claim 1 further comprising adding at least one binder to the inorganic fibers or to the gravity-laid inorganic fiber mat and wherein the consolidation is performed by activating the binder.

6. The method of claim 5 wherein the binder is an inorganic binder.

7. The method of claim 1 further comprising introducing at least one inorganic particulate additive into the forming chamber and blending the additive with the inorganic fibers.

8. A monolithic gravity-laid inorganic fiber web that is greater than about 5 cm in thickness.

9. The inorganic fiber web of claim 8 wherein the web is a blended fiber web comprising a blend of at least two types of inorganic fibers.

10. The inorganic fiber web of claim 8 wherein substantially all of the inorganic fibers of the web are biosoluble ceramic fibers.

11. The inorganic fiber web of claim 8 wherein at least about 5% by weight of the inorganic fibers of the web are long basalt fibers.

12. The inorganic fiber web of claim 8 wherein the web comprises an inorganic particulate additive.

13. The inorganic fiber web of claim 12 wherein the inorganic particulate additive comprises an intumescent additive.

14. The inorganic fiber web of claim 8 wherein the web comprises a binder and is needle-punched, such that the web comprises surface layers that are proximal to major surfaces of the web and that are consolidated by the combination of the binder and needle-punching, and such that the web further comprises an interior layer that is distal to the major surfaces of the web and that is consolidated only by the binder.

15. The method of claim 1 wherein the thickness of the gravity-laid inorganic fiber web is at least about 95% of the thickness of the gravity-laid inorganic fiber mat.

16. The method of claim 1 further comprising introducing at least one insulative inorganic additive into the forming chamber and blending the additive with the inorganic fibers.

17. The method of claim 1 wherein the consolidation comprises needle-punching the gravity-laid inorganic fiber mat in such a manner that the thickness of the gravity-laid inorganic fiber web is at least 60% of that of the gravity-laid inorganic fiber mat.

18. The method of claim 1 further comprising adding at least one binder to the inorganic fibers or to the gravity-laid inorganic fiber mat and wherein the gravity-laid inorganic fiber mat is consolidated by needle-punching followed by activating the binder.

19. The inorganic fiber web of claim 8 wherein the web comprises an intumescent additive that is expandable graphite.

20. The inorganic fiber web of claim 19 wherein the web comprises intumescent expandable graphite at from about 10% to about 50% by weight based on the total weight of the inorganic fiber web.

21. The inorganic fiber web of claim 8 wherein the web comprises an insulative inorganic additive.

* * * * *

UNITED STATES PATENT AND TRADEMARK OFFICE
CERTIFICATE OF CORRECTION

| | | |
|---|---|---|
| PATENT NO. | : 8,834,758 B2 | Page 1 of 1 |
| APPLICATION NO. | : 13/079911 | |
| DATED | : September 16, 2014 | |
| INVENTOR(S) | : James Endle et al. | |

It is certified that error appears in the above-identified patent and that said Letters Patent is hereby corrected as shown below:

In the Specification

<u>Column 5</u>
Line 42, Delete "tacking)" and insert -- tacking). --, therefor.

In the Claims

<u>Column 27</u>
Line 25 (Approx.), In Claim 4, after "method" insert -- of --.

Signed and Sealed this
Seventeenth Day of February, 2015

Michelle K. Lee
*Deputy Director of the United States Patent and Trademark Office*